United States Patent
Patten et al.

(10) Patent No.: US 8,681,481 B2
(45) Date of Patent: Mar. 25, 2014

(54) BUSHING ASSEMBLY FOR DRAW-OUT CIRCUIT BREAKER

(75) Inventors: Robert A. Patten, Deltona, FL (US); Robert S. Karnbach, Lake Mary, FL (US); Thomas P. McNamara, Lake Mary, FL (US)

(73) Assignee: ABB Technology AG, Zurich (CH)

( * ) Notice: Subject to any disclaimer, the term of this patent is extended or adjusted under 35 U.S.C. 154(b) by 190 days.

(21) Appl. No.: 13/496,699

(22) PCT Filed: Sep. 14, 2010

(86) PCT No.: PCT/US2010/048775
§ 371 (c)(1),
(2), (4) Date: Mar. 28, 2012

(87) PCT Pub. No.: WO2011/037786
PCT Pub. Date: Mar. 31, 2011

(65) Prior Publication Data
US 2012/0182669 A1    Jul. 19, 2012

Related U.S. Application Data

(60) Provisional application No. 61/245,395, filed on Sep. 24, 2009.

(51) Int. Cl.
*H02B 1/20*  (2006.01)
*H02B 11/12*  (2006.01)

(52) U.S. Cl.
USPC ........... 361/637; 361/608; 361/611; 361/624; 312/223.6

(58) Field of Classification Search
USPC ........ 361/605, 608–609, 611, 614, 622, 624, 361/637; 16/2.1; 312/223.6
See application file for complete search history.

(56) References Cited

U.S. PATENT DOCUMENTS

| | | | | |
|---|---|---|---|---|
| 2,083,379 | A * | 6/1937 | Hill | 361/611 |
| 7,601,028 | B2 * | 10/2009 | Eckel et al. | 439/579 |
| 7,633,741 | B2 | 12/2009 | Hughes et al. | |
| 2006/0118320 | A1 * | 6/2006 | Josten et al. | 174/50 |

FOREIGN PATENT DOCUMENTS

| | | | | |
|---|---|---|---|---|
| DE | 3341537 A1 | 5/1985 | | |
| DE | 29508111 U1 | 8/1995 | | |
| DE | 19838356 A1 * | 2/2000 | ........... | H02B 13/035 |
| EP | 1986301 A2 | 10/2008 | | |
| JP | 57189503 A * | 11/1982 | ............. | H02B 11/12 |
| JP | 09102251 A * | 4/1997 | ............. | H01H 33/53 |
| JP | 09330636 A * | 12/1997 | ............. | H01H 33/53 |
| JP | 11113153 A * | 4/1999 | ............. | H02G 15/06 |
| KR | 10-1238695 B1 * | 3/2013 | ........... | H02B 11/127 |
| WO | 2011037786 A1 | 3/2011 | | |

* cited by examiner

*Primary Examiner* — Robert J Hoffberg
(74) *Attorney, Agent, or Firm* — Michael C. Prewitt; Melissa J. Szczepanik

(57) ABSTRACT

A rear panel for a draw-out circuit breaker includes a metal plate having a pair of rectangular cutouts. Two bushing blocks are joined together and at least partially extend through the cutouts. Each molded bushing block includes three bushings, each of which carry an electrical conductor that is overmolded therein.

17 Claims, 18 Drawing Sheets

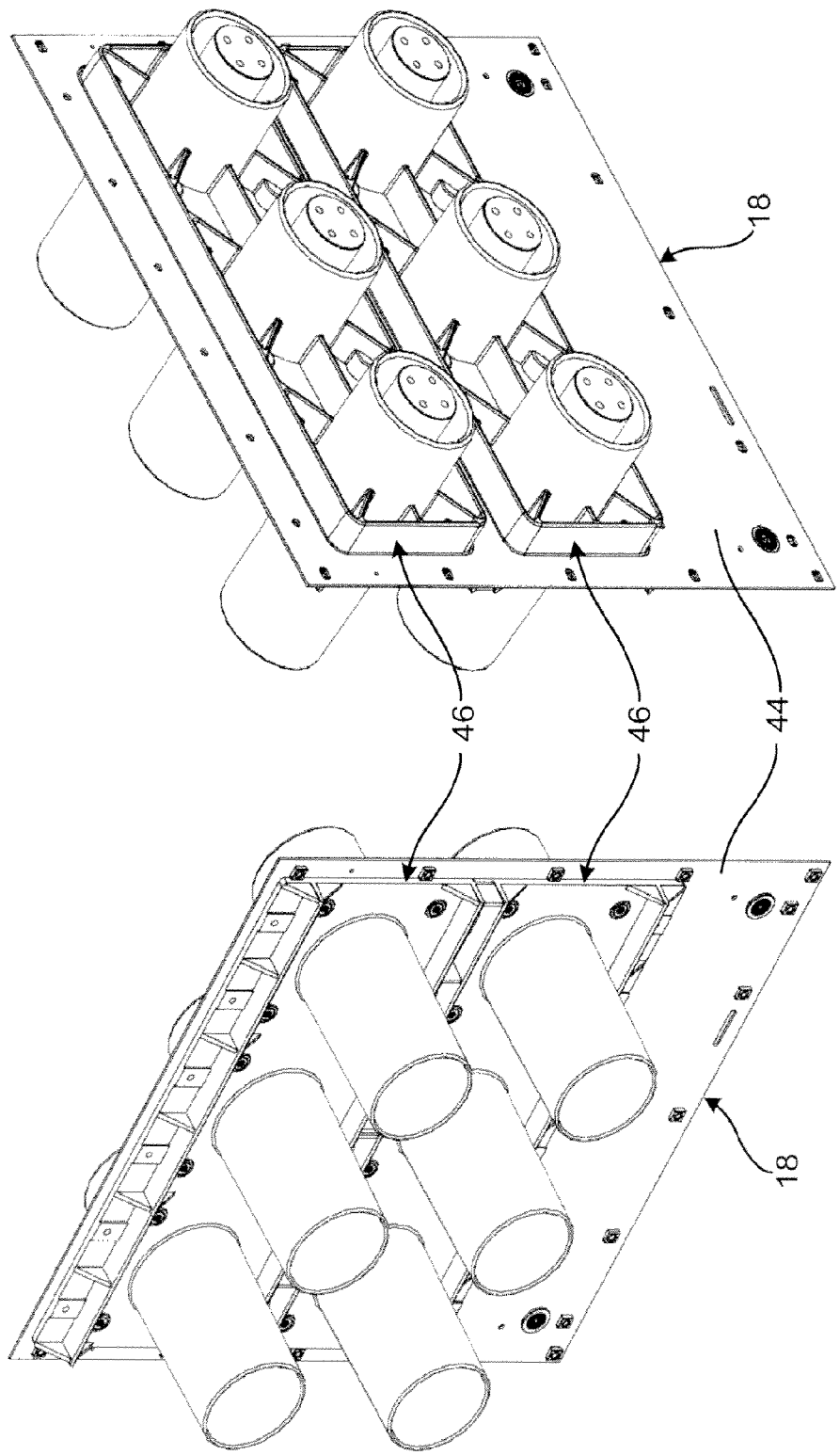

BUSHING ASSEMBLY FOR DRAW-OUT CIRCUIT BREAKER

BACKGROUND

In high current applications, circuit breakers are typically quite large, which makes it difficult to move the circuit breaker to electrically connect and disconnect it from a switchboard without mechanical assistance. Not only does the weight and bulk of the circuit breaker become difficult for the electrician to handle, but, as the current ratings increase, the contact pressures of the primary disconnect contacts become extremely difficult, if not impossible to overcome. To overcome these problems, so-called "draw-out" assemblies are used to support the circuit breaker and provide mechanical assistance to overcome the contact pressures of the disconnect contacts.

Draw-out apparatus are generally designed to support the electrical device for racking movement between an extended position and an engaged position where the load current carrying primary disconnects of the device are fully engaged. As is well known in the art, three-phase draw-out circuit breakers include six primary disconnect bushings that extend rearwardly from the back panel of the circuit breaker. In the past, the back panel was formed by cutting six holes in a stainless steel sheet, then installing individual molded bushings in each hole. Each bushing was bolted in place, and when installed onto the switchgear, an additional formed steel strap was bolted horizontally across the center of the back panel for further support. Though the previous back panel/bushing design is functional, drawbacks persist.

There is therefore a need in the art for improved switchgear rear panel and bushing arrangements.

SUMMARY OF THE INVENTION

According to one aspect of the present invention a rear panel for a draw-out circuit breaker assembly includes a metal plate having a top hole and a bottom hole. A top bushing block includes an engagement edge and three bushings, each bushing carrying a conductor. A bottom bushing block includes an engagement edge and three bushings, each bushing also carrying a conductor. The bottom bushing block is of identical construction to the top bushing block. The engagement edge of the top bushing block intermeshes with the engagement edge of the bottom bushing block to restrict relative movement therebetween. The top bushing block extends at least partially through the top hole and the bottom bushing block extends at least partially through the bottom hole.

According to another aspect of the present invention, a bushing assembly for an electrical device includes a molded body having a generally planar portion with a first surface and an opposed second surface. The molded body further includes three bushings arranged in a linear row and an engagement edge. A conductor is positioned in each bushing and are over-molded integrally in the molded body. The engagement edge is adapted to intermesh with an engagement edge of a second bushing assembly to restrict relative movement therebetween.

FIG. 11 is a front isometric view of the rear panel.

FIG. 12 is a rear isometric view of the rear panel.

DETAILED DESCRIPTION OF THE INVENTION

Figure 1:
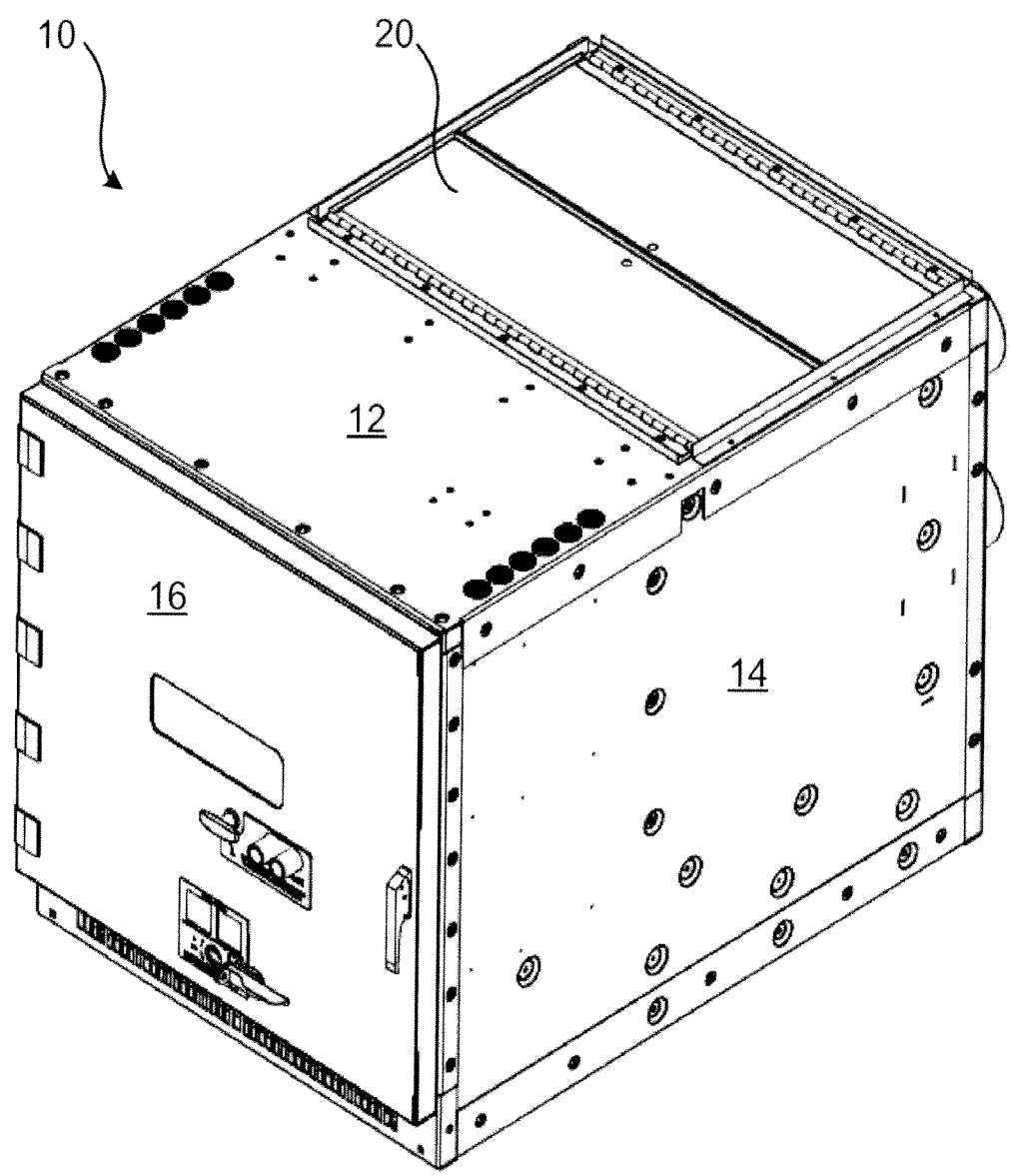
FIG. 1 is a front isometric view of the circuit breaker assembly according to the present invention.
Figure 2:
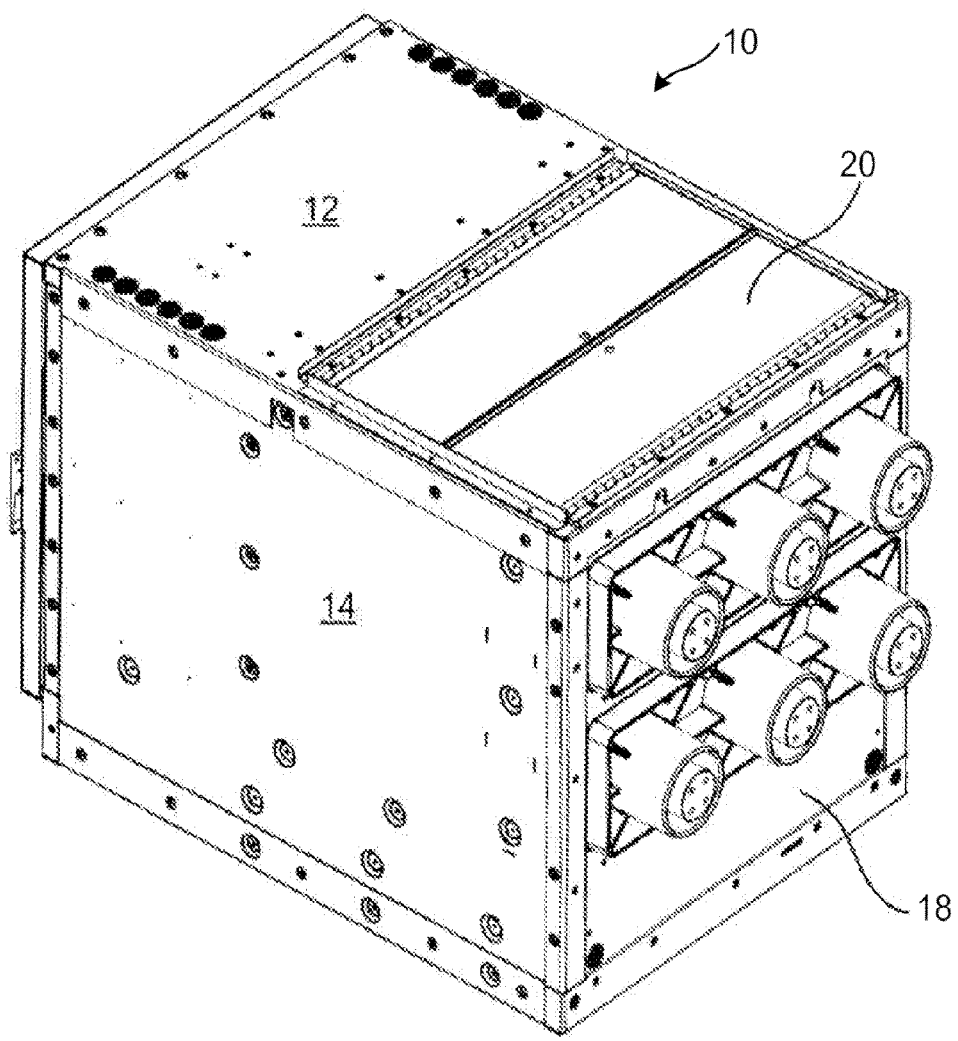
FIG. 2 is a rear isometric view of the circuit breaker assembly.
Figure 3:
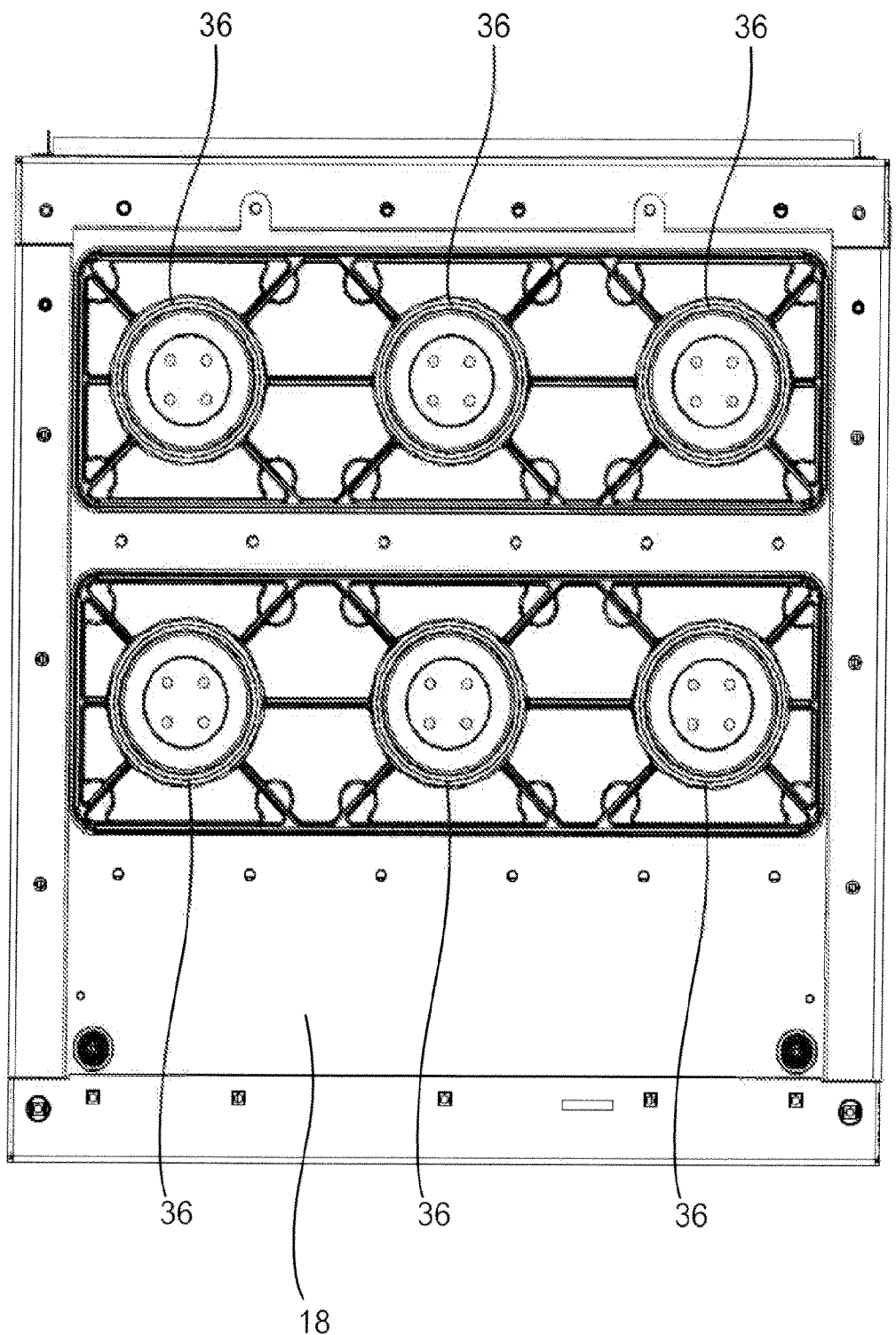
FIG. 3 is a rear view of the circuit breaker assembly.
Figure 4:
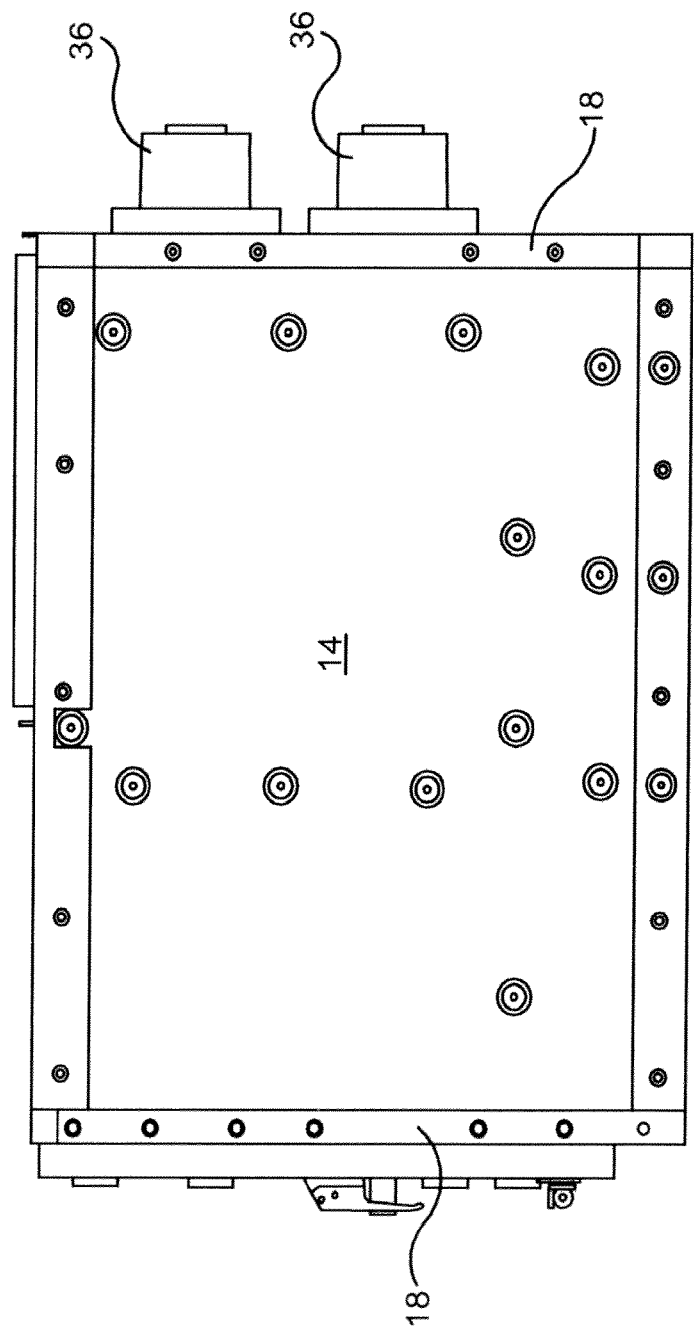
FIG. 4 is a right side view of the circuit breaker assembly.
Figure 5:
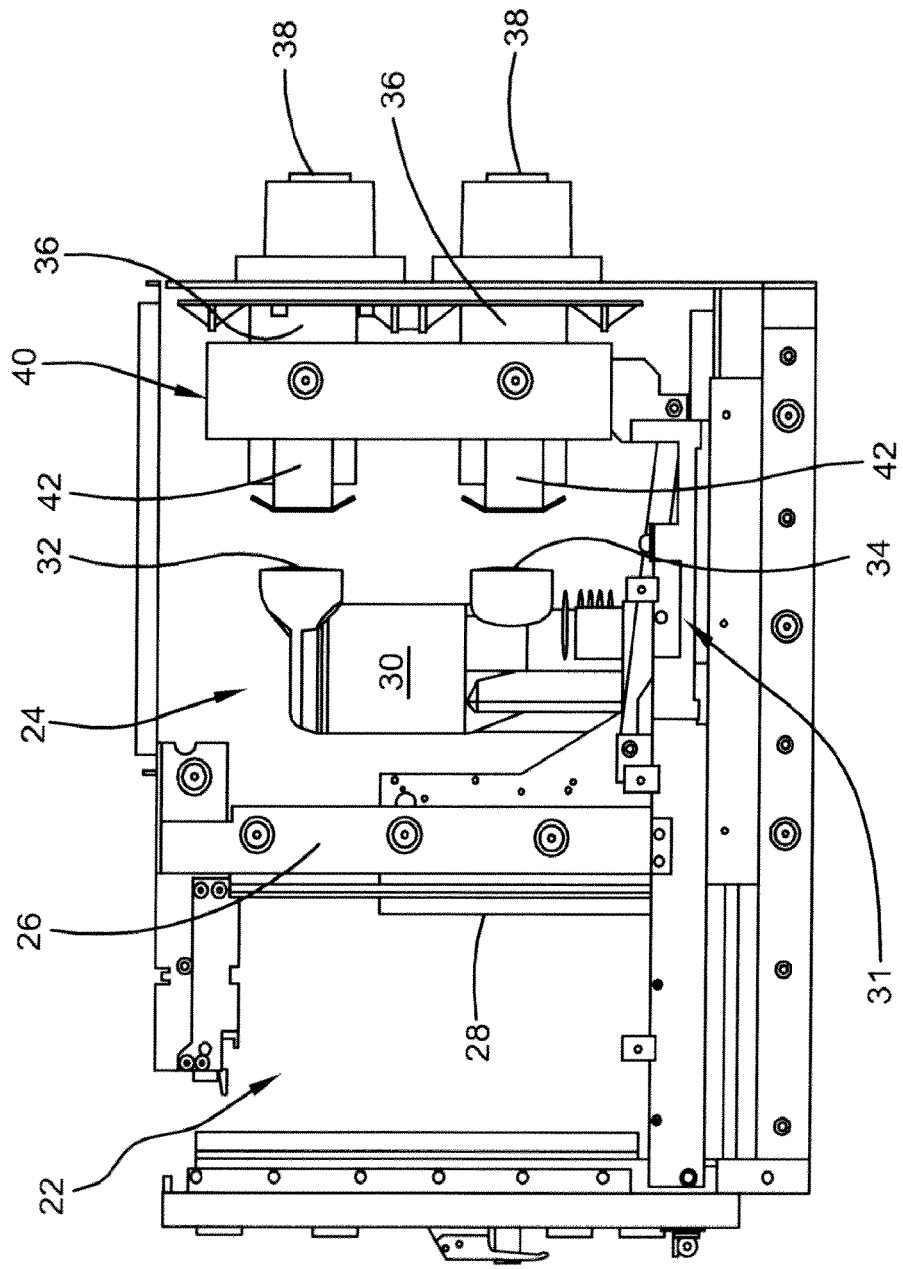
FIG. 5 is a right side view of the circuit breaker assembly with the side and top panels removed.
Figure 6:
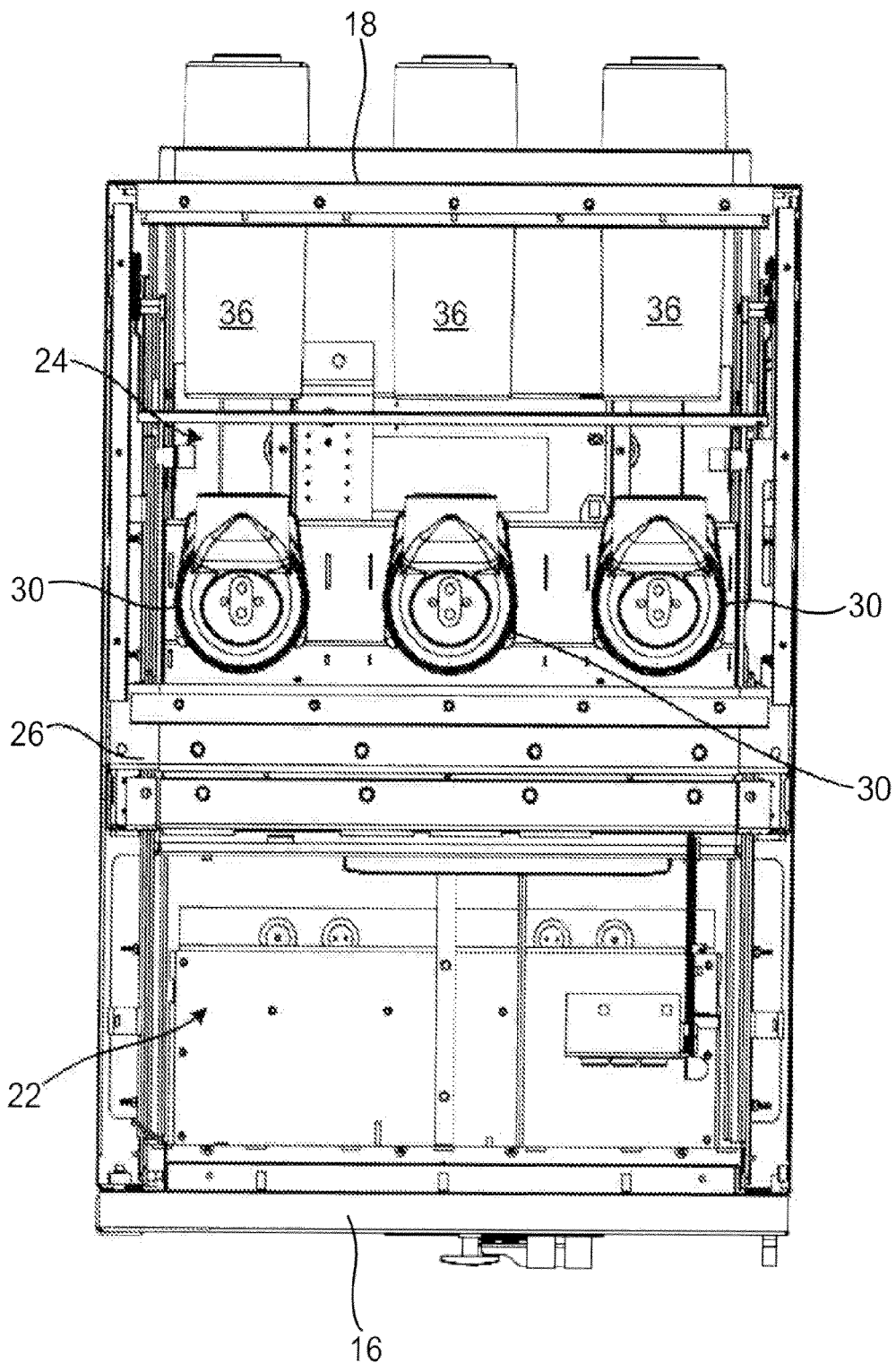
FIG. 6 is a top view of the circuit breaker assembly with the side and top panels removed.
Figure 7:
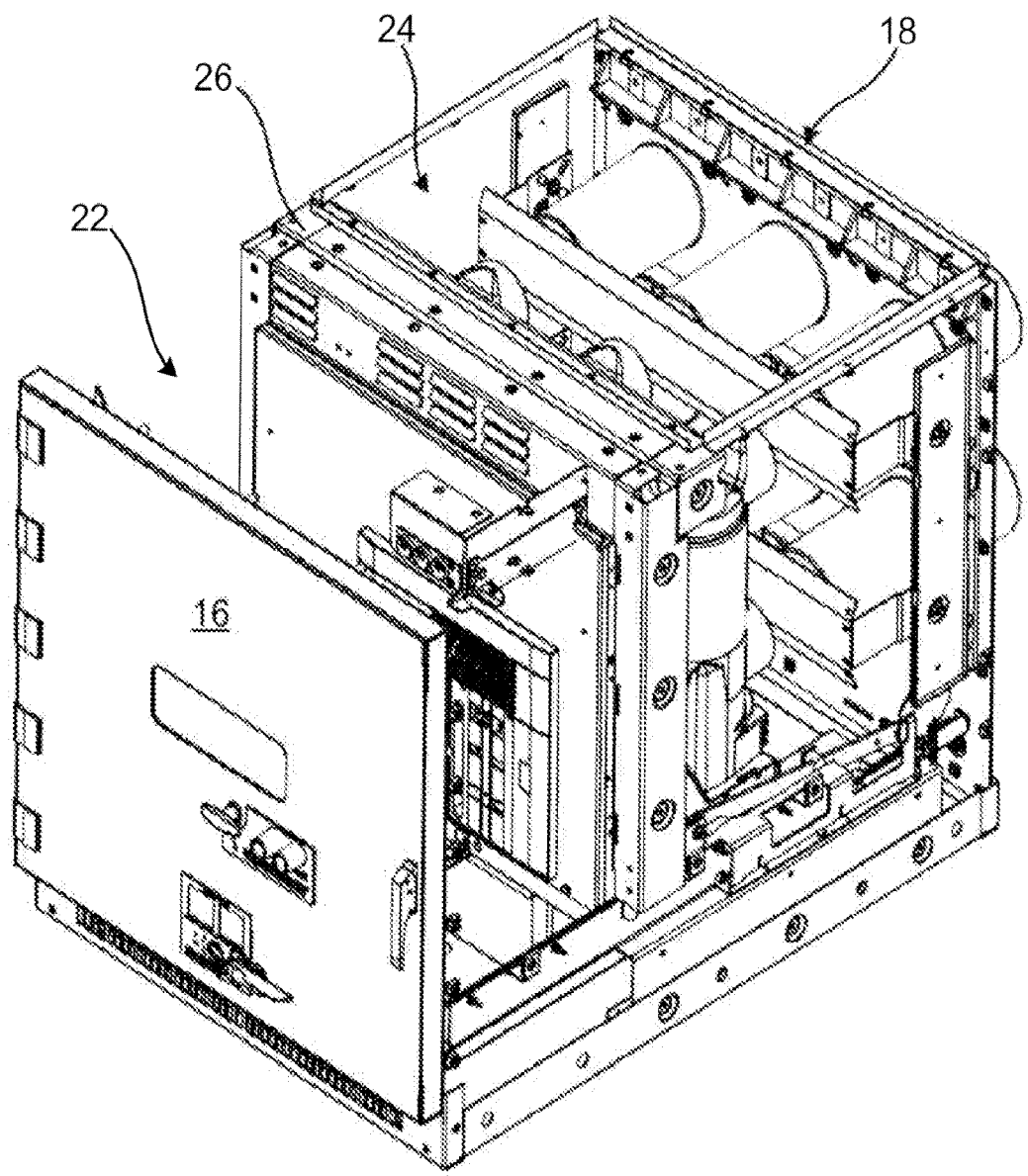
FIG. 7 is a front isometric view of the circuit breaker assembly with the side and top panels removed.
Figure 8:
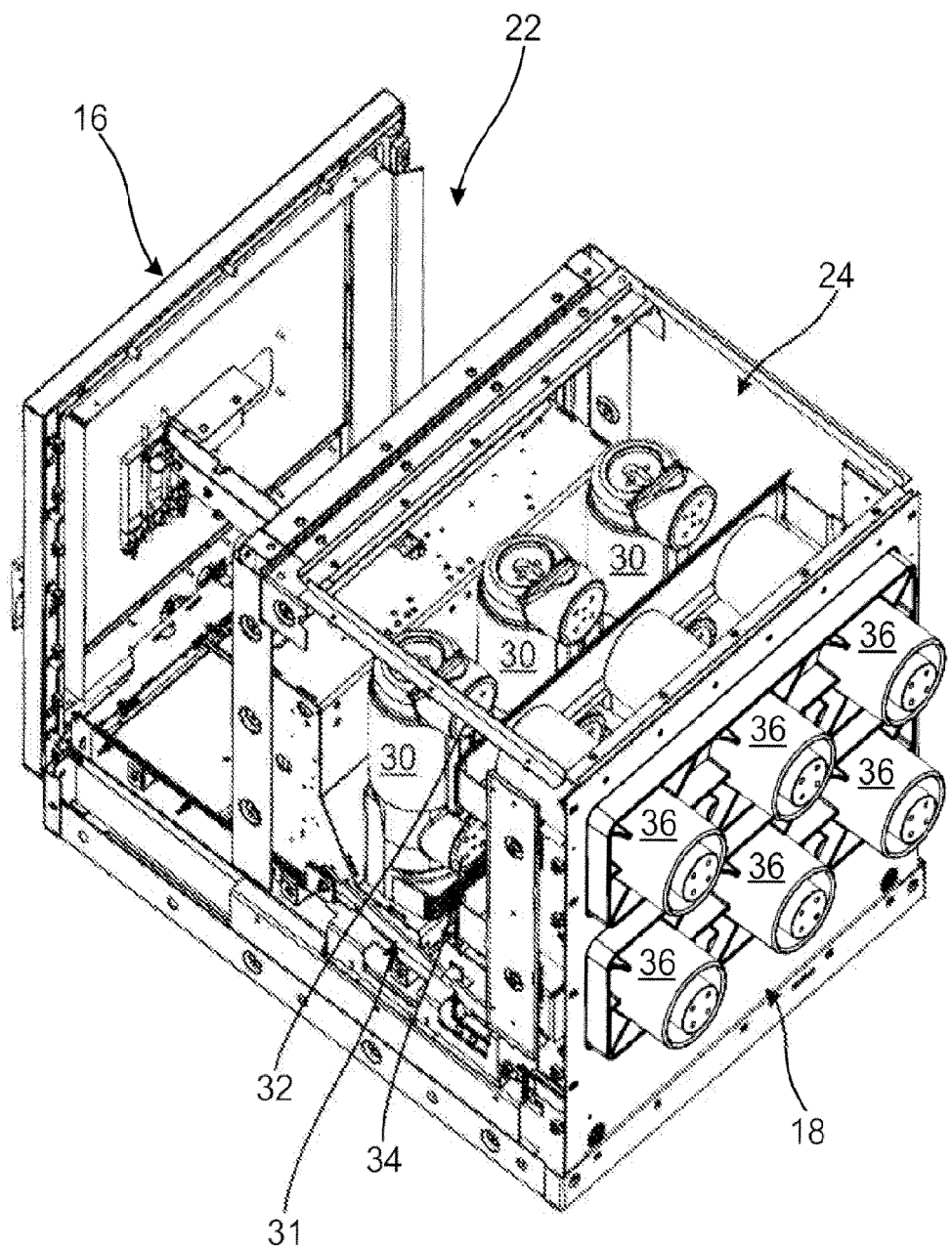
FIG. 8 is a rear isometric view of the circuit breaker assembly with the side and top panels removed.
Figure 9:
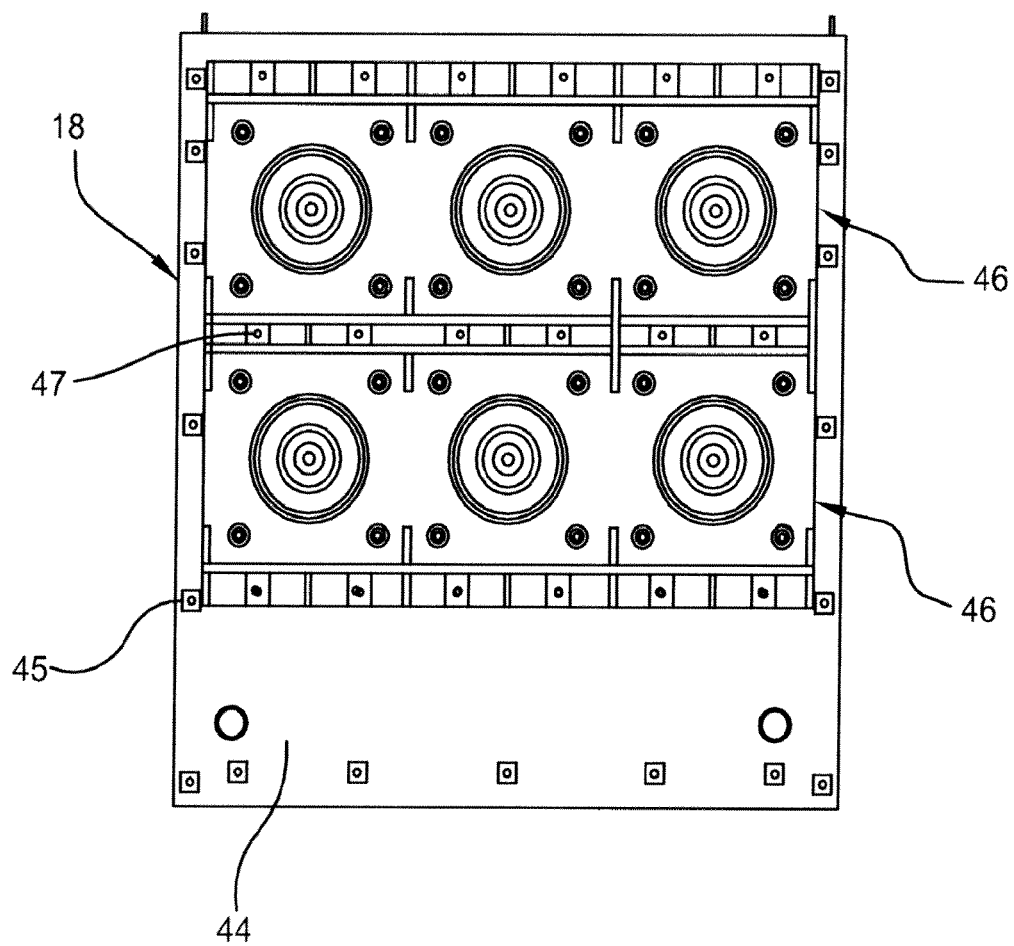
FIG. 9 is a front view of the rear panel.
Figure 10:
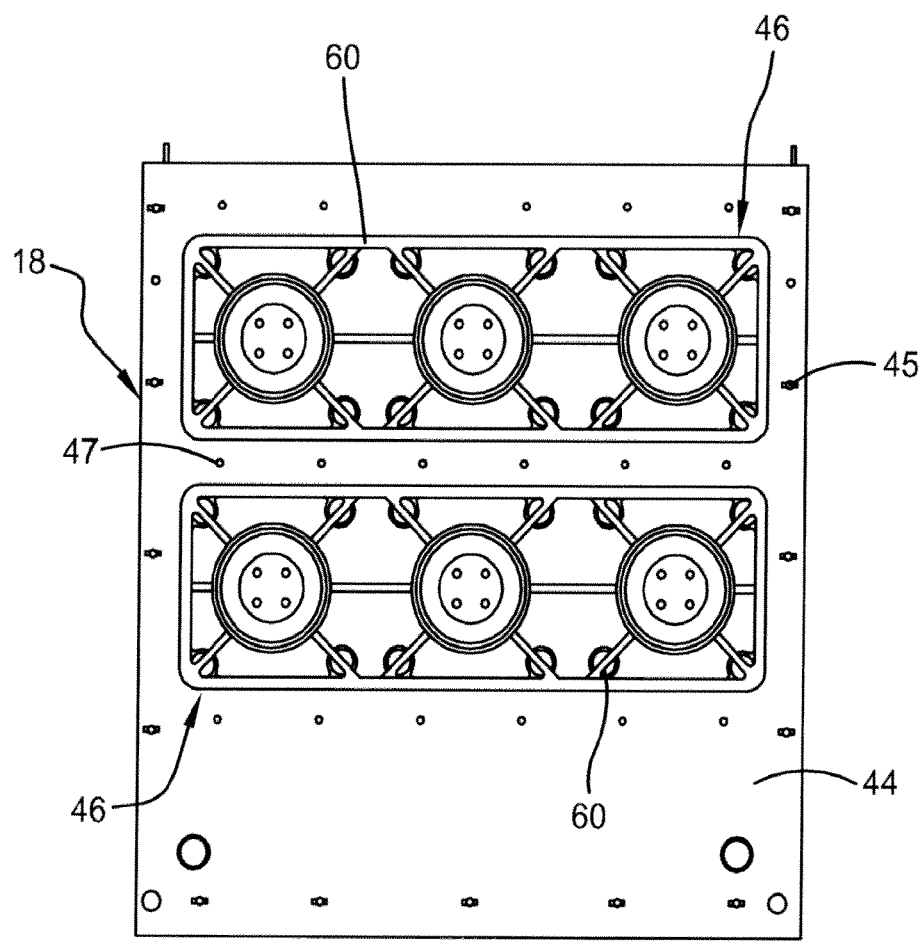
FIG. 10 is a rear view of the rear panel.
Figure 13:
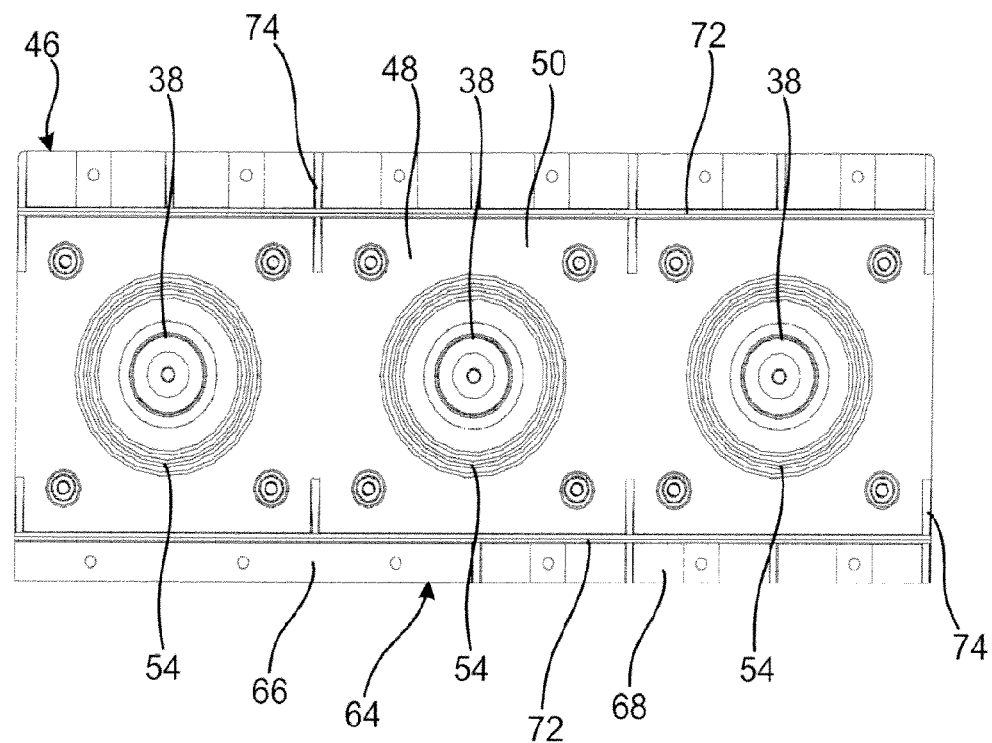
FIG. 13 is a front view of the bushing block.
Figure 14:
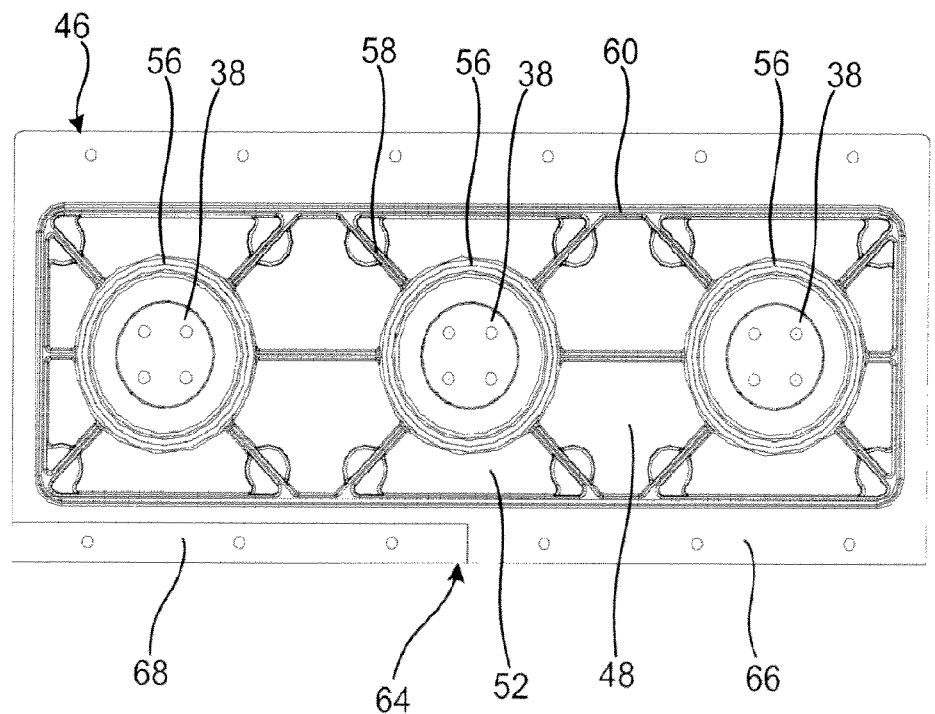
FIG. 14 is a rear view of the bushing block.
Figure 15:
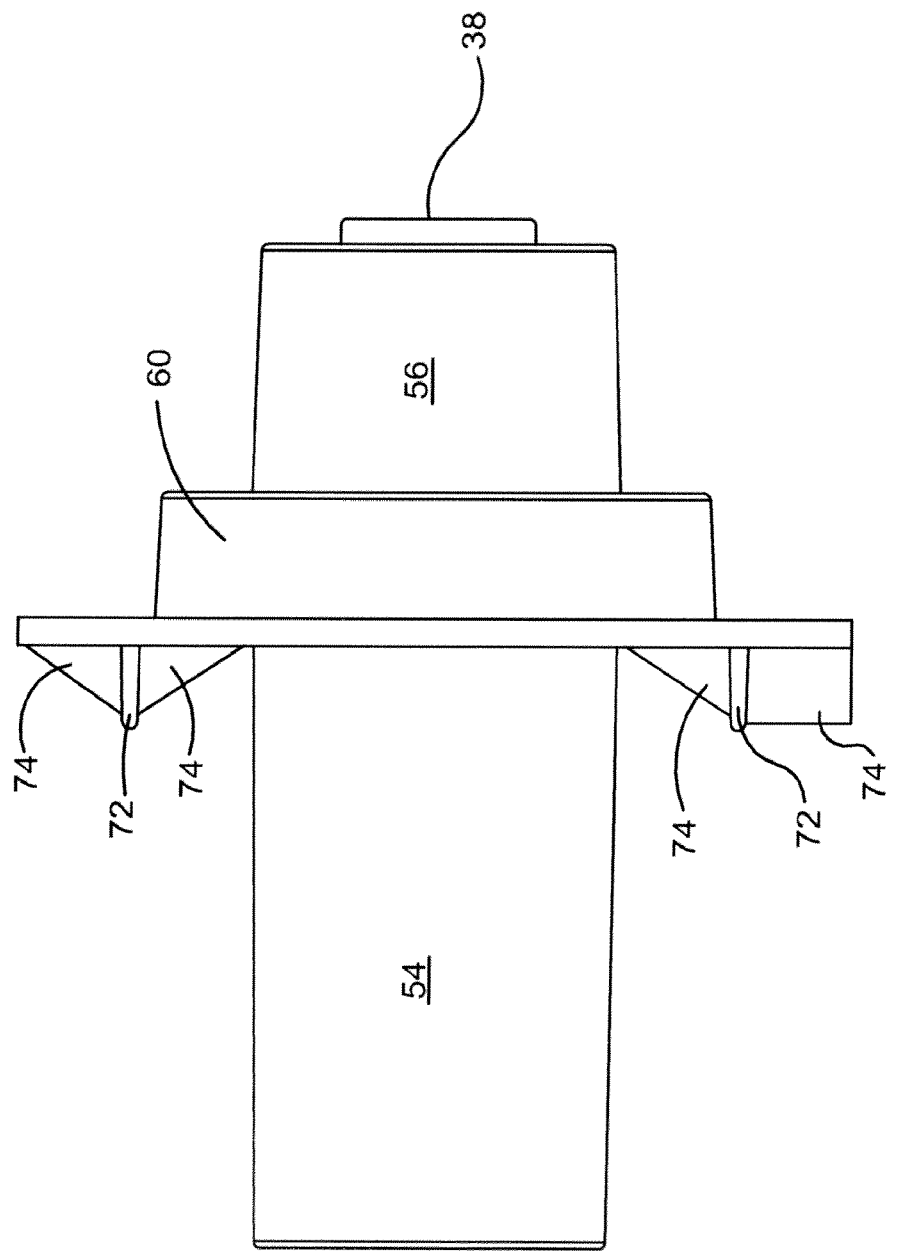
FIG. 15 is a right side view of the bushing block.
Figure 16:
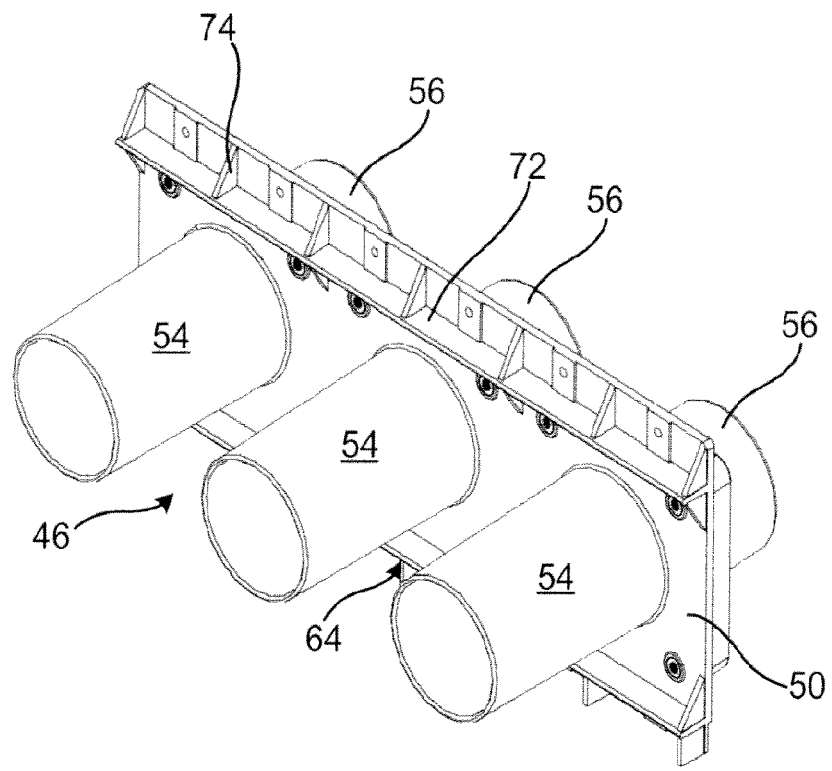
FIG. 16 is a front isometric view of the bushing block.
Figure 17:
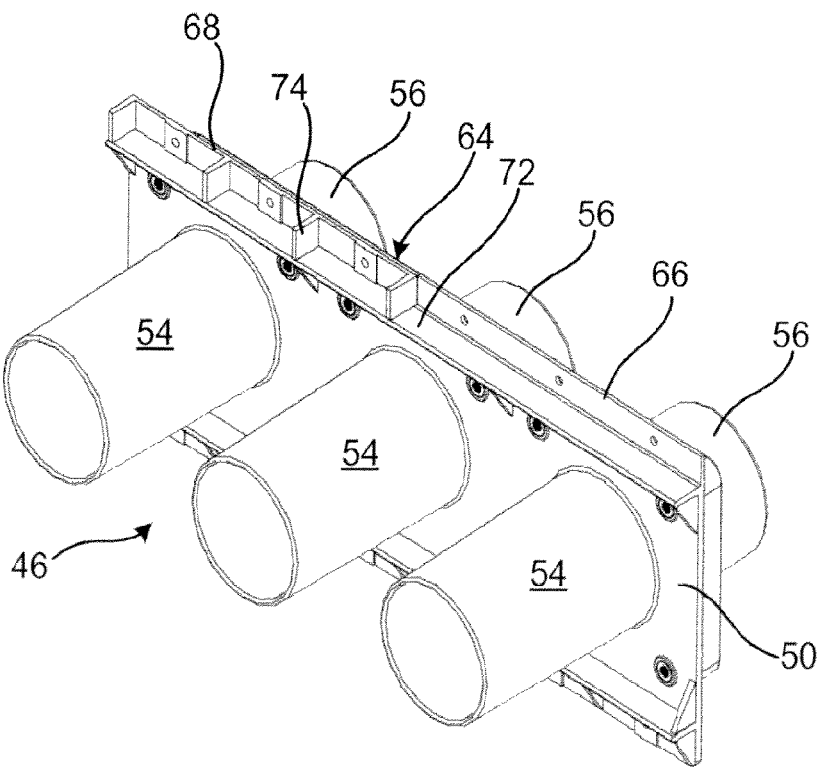
FIG. 17 is a front isometric view of the bushing block showing the engagement edge.
Figure 18:
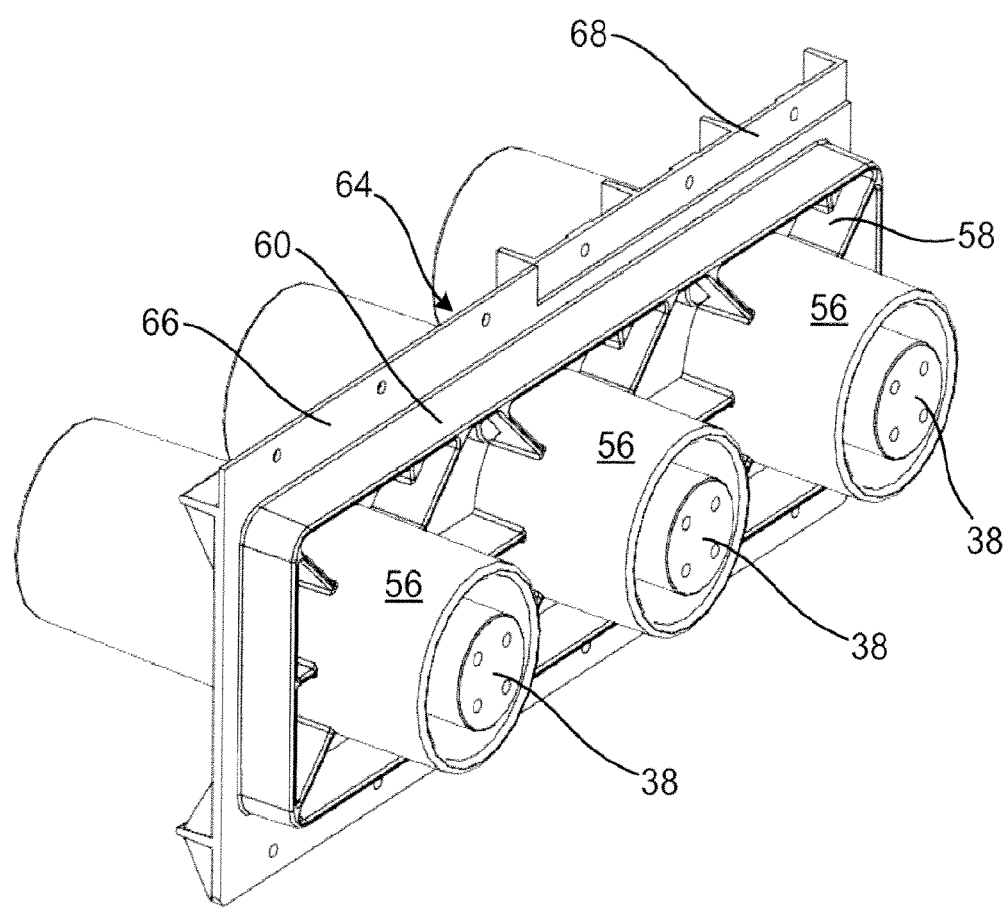
FIG. 18 is a rear isometric view of the bushing block showing the engagement edge.

With reference now to FIGS. 1-4, a pull-out circuit breaker assembly is shown and generally indicated by the numeral 10. Circuit breaker assembly 10 is generally rectangular in shape and includes a top panel 12, bottom panel (not shown), side panels 14, a front panel 16 and a rear panel 18. Top panel 12 includes hinged flaps 20 that, in the case of an accidental arcing, allow gas and/or plasma to escape upwardly.

With reference now to FIGS. 5-8 it can be seen that breaker assembly 10 is internally separated into a front chamber 22 and a rear chamber 24 by an interior wall 26. Various monitoring and/or control electronics 28 are mounted on interior wall 26 facing the front chamber 22. Front chamber 22 is accessible through the hinged front panel 16.

Three individual circuit breaker vacuum interrupter pole assemblies 30 are located within rear chamber 24. As is known in the art, breaker poles 30 each include a top electrical disconnect 32 and a bottom electrical disconnect 34. As is known in the art, a female primary disconnect (not shown) extends from each top and bottom electrical contact toward bushing 36. Circuit breaker poles 30 are designed to selectively open or close an electrical connection between top and bottom electrical disconnects 32 and 34. Vacuum interrupter breaker pole assemblies 30 are mounted on a drive mechanism 31 that selectively moves the breaker poles 30 toward and away from bushings 36 in rear panel 18. Bushings 36 each include an electrical conductor or male primary disconnect 38. Thus, drive mechanism 31 selectively brings the electrical disconnects 32 and 34, via female primary disconnects, into contact with the conductors 38 in bushings 36 to form a current path into and out of breaker 10.

A shield assembly 40 is also located inside rear chamber 24 and includes a pair of shield plates 42 that are positioned between electrical disconnects 32/34 and electrical conductors 38 when breaker poles 30 are spaced from conductors 38. The shield plates 42 are lowered out of the way as the breaker poles 30 move toward electrical conductors 38.

With reference now to FIGS. 9-12, rear panel 18 includes a plate 44 and a pair molded bushing blocks 46. Plate 44 may be made of metal. In one embodiment, plate 44 is stainless steel.

Rear panel is secured to the breaker 10 by fasteners (not shown) received through plate bolt holes 45. Likewise, bushing blocks 46 are secured to plate 44 with fasteners (not shown) received in aligned holes 47 through plate 44 and bushing blocks 46. Bushing blocks 46 may be made of any moldable material. According to one embodiment, bushing blocks 46 are made from a high strength polymer having any suitable filler material. In another embodiment, bushing block 46 is made from an epoxy. In still another embodiment, bushing blocks 46 are made from a glass filled polyester.

With reference now to FIGS. 13-18, each bushing block 46 includes a generally planar body 48 having an interior surface 50 and an opposed exterior surface 52. Each bushing block 46 includes three bushings 36 arranged in a row. Each bushing 36 includes a cylindrical projection 54 extending forwardly from interior surface 50 toward circuit breakers 30, and a cylindrical projection 56 extending rearwardly from exterior surface 52 away from rear chamber 24. Cylindrical projections 54 and 56 carry electrical conductor 38, which is preferably molded therein. As should be apparent, electrical conductor provides an electrical path between each of the circuit breaker poles 30 and an external electrical circuit (not shown). Except for conductor 38, all portions of bushing block 46 are preferably formed of plastic and are molded as a single unitary piece. In one embodiment, conductors 38 are over-molded integrally in bushing block 46.

Figure 22:
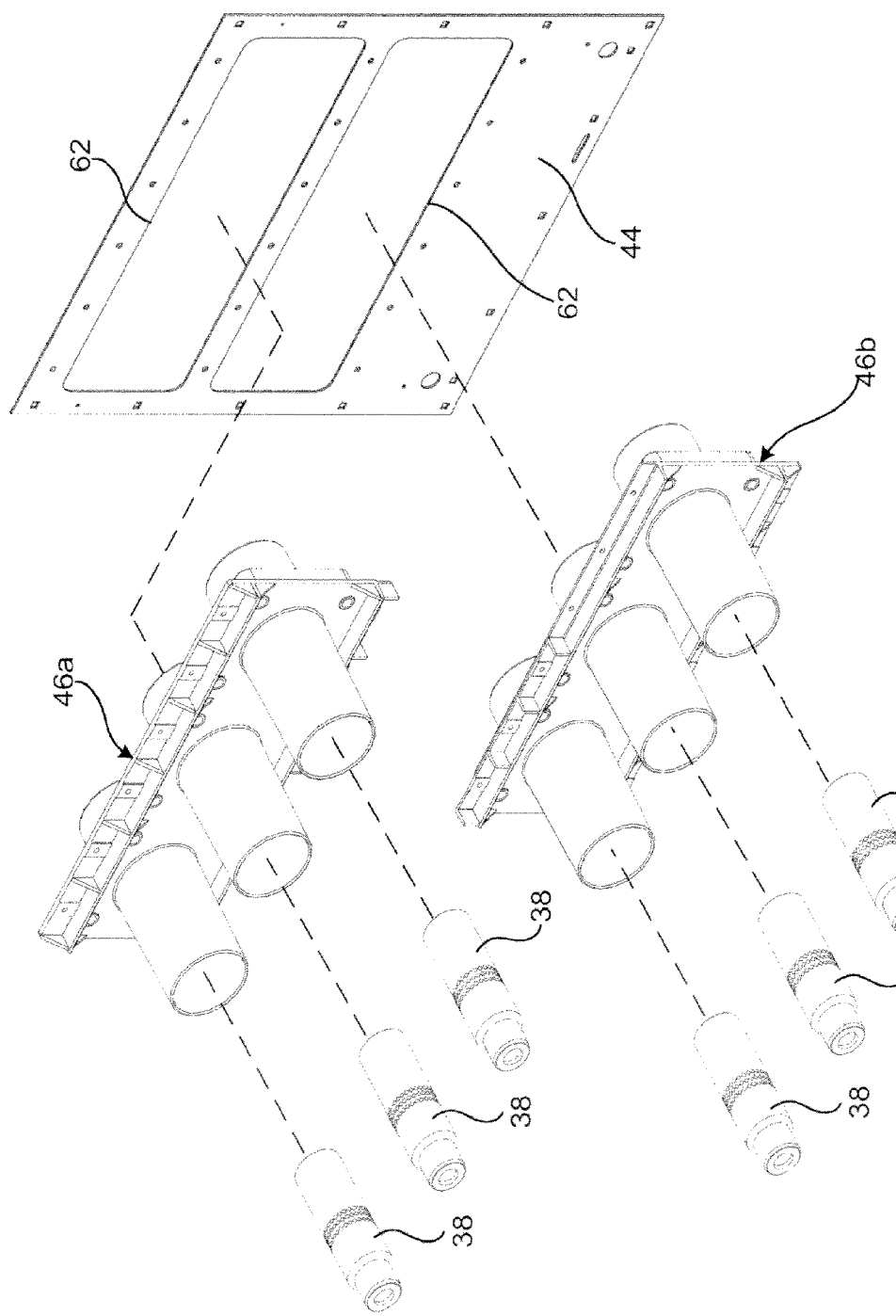
FIG. 22 is an exploded view of the rear panel.

A plurality of radial ribs 58 extend outwardly from exterior surface 52 and radially away from cylindrical projection 56. Ribs 58 terminate at a generally rectangular rib 60 that surrounds bushings 36. Ribs 58 and 60 provide structural rigidity for bushing block 46. Plate 44 includes a pair of generally rectangular holes 62 (see FIG. 22) which are sized slightly larger than rectangular rib 60. In this manner, when assembled, ribs 58 and 60 extend through holes 62 and exterior surface 52 abuts the plate 44.

Top bushing block 46a is structurally identical to bottom bushing block 46b, though each are positioned in a different orientation. Likewise, bushing blocks 46 are adapted to abut and intermesh with each other. Accordingly, each bushing block 46 includes an engagement edge 64. The engagement edges 64 mesh when the top bushing block 46a is arranged with the engagement edge 64 facing downward, and the bottom bushing block 46b is arranged with the engagement edge 64 facing upward.

Figure 19:
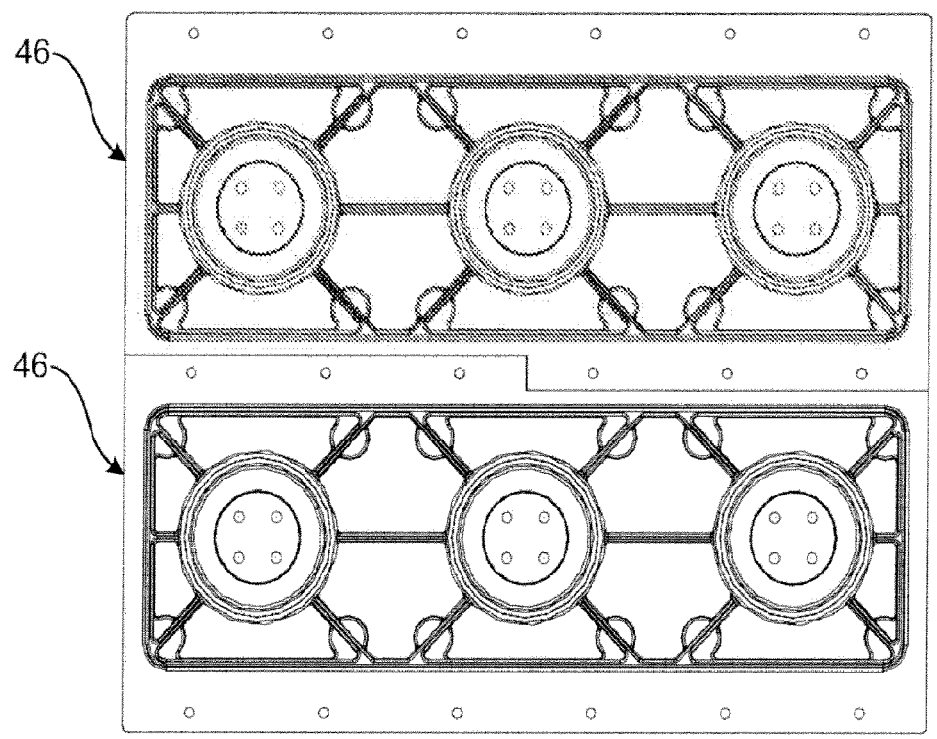
FIG. 19 is a rear view of a pair of bushing blocks in a meshed arrangement.
Figure 20:
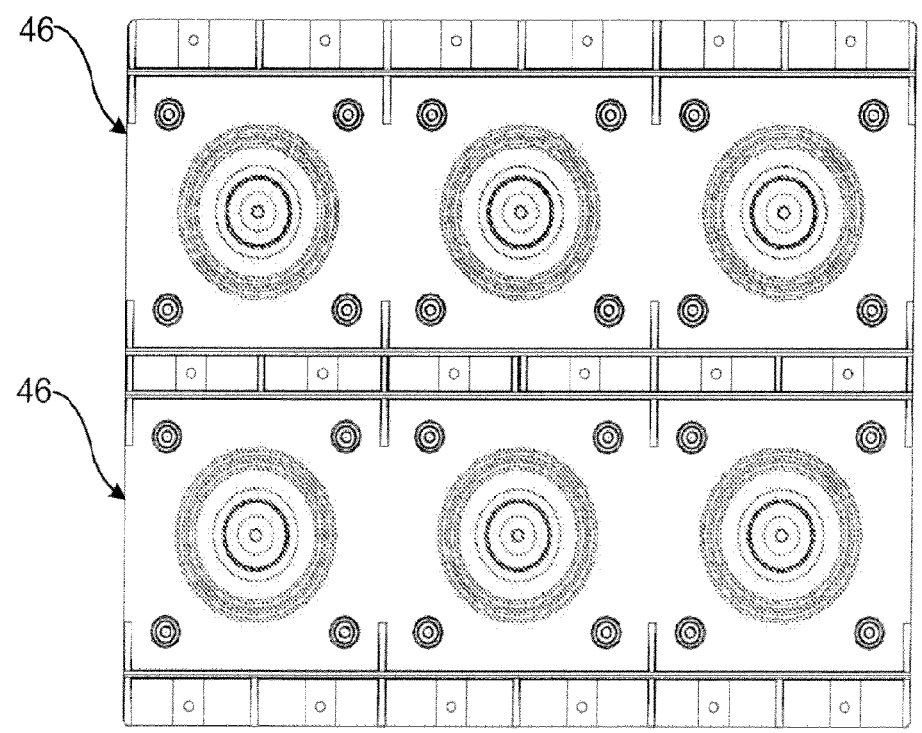
FIG. 20 is a front view of a pair of bushing blocks in a meshed arrangement.
Figure 21:
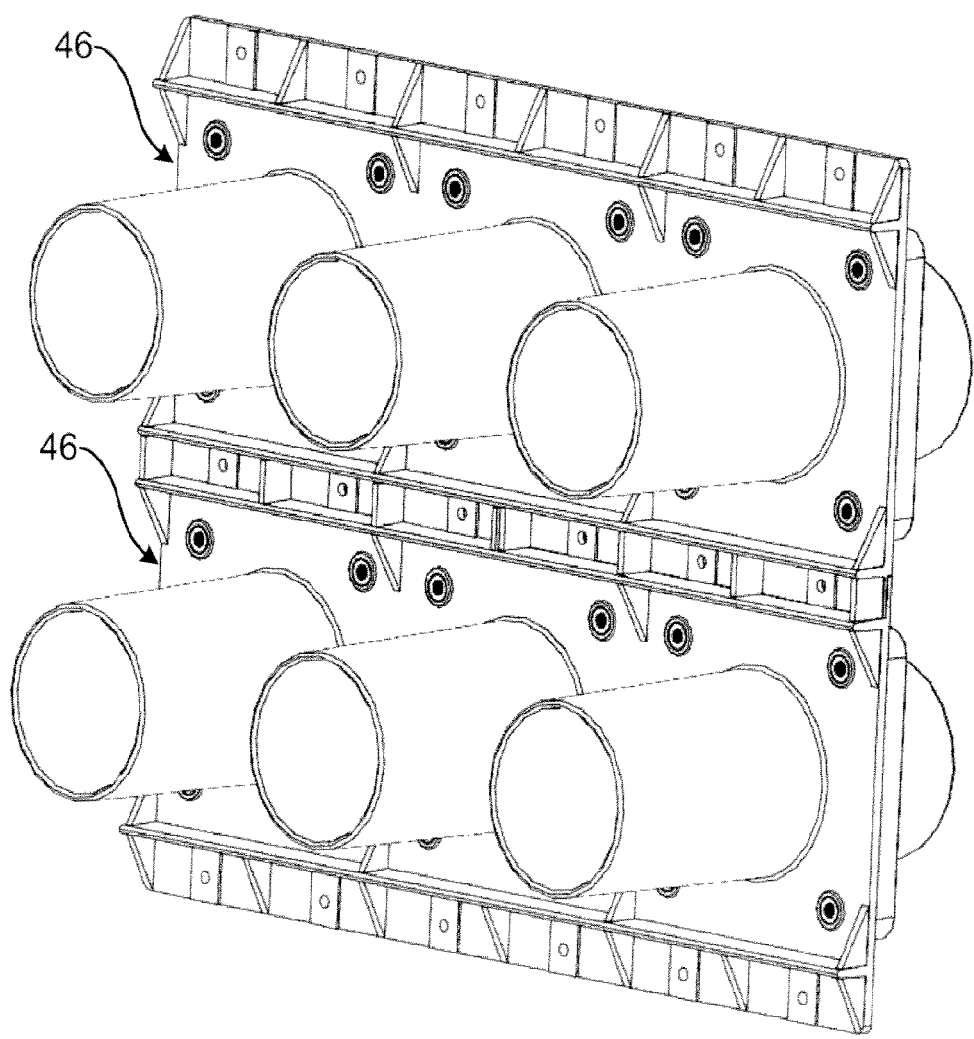
FIG. 21 is an elevated front and right side view of a pair of bushing blocks in a meshed arrangement.

Engagement edge 64 includes a first leg 66 that is generally flush with exterior surface 52 and runs half the longitudinal length of bushing block 46. A second leg 68 is offset from exterior surface and extends the other half of the longitudinal length of bushing block 46. As can be seen in FIGS. 19-21, when the two bushing blocks 46 are arranged so that the engaging edges 64 are meshed, legs 66 and 68 overlap.

A pair of longitudinal ribs 72 extend from interior surface 50 and run along the entire longitudinal edge of bushing block 46. Ribs 72 are spaced from the bottom and top edges of bushing block 46 and include a plurality of struts 74 extending therefrom to further add structural strength. In order to facilitate the meshing discussed above, no struts 74 extend over the area of first leg 66. In this manner, the when the two bushing blocks 46 are mated, struts 74 extend the entire longitudinal length of bushing blocks 46.

According to one embodiment, an optional metal strap may extend across the abutted engagement edges 64 on the interior of breaker 10. The metal strap may extend the entire horizontal width of rear panel 18 and be secured at each end to the housing of breaker 10. In this manner, the metal strap could provide additional support for bushing blocks 46.

It should be appreciated that, though the embodiment disclosed in the figures includes a singe rear plate having two rectangular cut-outs, other rear panel configurations are contemplated. For example, in applications requiring less overall strength, the rear panel could include the two intermeshed bushing blocks 46 as described above, however, instead of a single plate having two cutouts, two separate metal plates could be used. In such a configuration, a top plate to be positioned above the bushing blocks and a bottom plate could be positioned below the bushing blocks. Such an embodiment may include the optional metal strap as discussed above.

The molded bushing blocks allows two identical three phase bushing and primary disconnect assemblies to be joined directly, by simply inverting one molding, sliding them together and connecting them as one assembly. This produces a single, six pole, back panel and bushing assembly with primary disconnects that are designed to withstand the forces generated during the connecting and disconnecting of the primary disconnects and also during arc resistance. This provides a strong single assembly that reduces cost, assembly time and provides for all the various mechanical requirements and range of electrical ratings of the breaker assemblies. Designed for use with arc resistant breakers and cubicles, it also provides for the separation and sealing of adjacent compartments during an arcing fault. Stability is improved from mechanical forces acting on the primary connections during a fault due to the specific bracing used throughout the design including the molded bushing assembly and the mating parts.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A rear panel for a draw-out circuit breaker assembly, the rear panel comprising:
   a metal plate having a top hole and a bottom hole;
   a top bushing block including an engagement edge and three bushings, each said bushing carrying a conductor;
   a bottom bushing block including an engagement edge and three bushings, each said bushing carrying a conductor, said bottom bushing block being of identical construction as said top bushing block; and
   wherein said engagement edge of said top bushing block intermeshing with said engagement edge of said bottom bushing block to restrict relative movement therebetween, said top bushing block extending at least partially through said top hole, said bottom bushing block extending at least partially through said bottom hole.

2. The rear panel according to claim 1, wherein said plate is composed of metal.

3. The rear panel according to claim 2, wherein said plate is composed of stainless steel.

4. The rear panel according to claim 1, wherein each said bushing block includes a substantially planar body having an interior surface and an opposed exterior surface.

5. The rear panel according to claim 4, wherein said three bushings are arranged in a linear row.

6. The rear panel according to claim 4 wherein each said bushing includes a first cylindrical projection extending outwardly from said interior surface and a second cylindrical projection extending outwardly from said exterior surface.

7. The rear panel according to claim 6 wherein said conductors are over-molded integrally in said bushing block.

8. The rear panel according to claim 6 wherein each said bushing block further includes a plurality of radial ribs extend outwardly from said exterior surface and radially away from said second cylindrical projection.

9. The rear panel according to claim 8 wherein each said bushing block further includes a substantially rectangular rib extending outwardly from said exterior surface and around all three said bushings, said radial ribs terminating at said rectangular rib.

10. The rear panel according to claim 9 wherein said top hole and said bottom hole are sized slightly larger than said rectangular rib, said rectangular rib of said top bushing block extending through said top hole and said rectangular rib of said bottom bushing block extending through said bottom hole, said exterior surface of each said bushing block abuts said plate.

11. The rear panel according to claim 1 wherein said top hole and said bottom hole are substantially rectangular.

12. The rear panel according to claim 4, wherein said engagement edge includes a first leg that is flush with said exterior surface and runs half a longitudinal length of said bushing block, and a second leg being offset from said exterior surface and extends along another half of the longitudinal length of said bushing block.

13. The rear panel according to claim 4 wherein each said bushing block includes a pair of longitudinal ribs extending outwardly from said interior surface and running along an entire longitudinal edge of each said bushing block.

14. A bushing assembly for an electrical device, the bushing assembly comprising:
a molded body having a substantially planar portion having a first surface and an opposed second surface, three bushings arranged in a linear row, and an engagement edge, said engagement edge including a first leg that is flush with said second surface and runs half a longitudinal length of said molded body, and a second leg being offset from said second surface in a direction perpendicular to said second surface, said second leg extending along another half of the longitudinal length of said molded body;
a conductor positioned in each said bushing, said conductors being over-molded integrally in said molded body;
wherein said engagement edge adapted to intermesh with an engagement edge of a second bushing assembly to restrict relative movement therebetween when said engagement edge of said bushing assembly is arranged in a first direction and said engagement edge of said second bushing assembly is arranged in a second opposing direction, and
wherein the second bushing assembly is structurally identical to the bushing assembly.

15. The bushing assembly according to claim 14 wherein each said bushing includes a first cylindrical projection extending outwardly from said first surface and a second cylindrical projection extending outwardly from said second surface.

16. The bushing assembly according to claim 14 wherein said molded body further includes a plurality of radial ribs extend outwardly from said second surface and radially away from said second cylindrical projection.

17. The bushing assembly according to claim 16 wherein said molded body further includes a substantially rectangular rib extending outwardly from said second surface and around all three said bushings, said radial ribs terminating at said rectangular rib.

* * * * *